United States Patent
Wiechers et al.

(10) Patent No.: US 10,246,053 B2
(45) Date of Patent: Apr. 2, 2019

(54) AUTHORIZATION TO OPEN A RECEIVING COMPARTMENT OF AN UNMANNED VEHICLE

(71) Applicants: Ralph Wiechers, Mayschoß (DE); Christian Ibach, Bonn (DE)

(72) Inventors: Ralph Wiechers, Mayschoß (DE); Christian Ibach, Bonn (DE)

(73) Assignee: Deutsche Post AG, Bonn (DE)

(*) Notice: Subject to any disclaimer, the term of this patent is extended or adjusted under 35 U.S.C. 154(b) by 0 days.

(21) Appl. No.: 15/724,646

(22) Filed: Oct. 4, 2017

(65) Prior Publication Data

US 2018/0099641 A1 Apr. 12, 2018

(30) Foreign Application Priority Data

Oct. 6, 2016 (DE) .................. 10 2016 118 994

(51) Int. Cl.
| | |
|---|---|
| *B60R 25/24* | (2013.01) |
| *G06Q 50/28* | (2012.01) |
| *G06Q 10/08* | (2012.01) |
| *G07C 9/00* | (2006.01) |
| *G06Q 50/30* | (2012.01) |

(52) U.S. Cl.
CPC .......... *B60R 25/24* (2013.01); *G06Q 10/083* (2013.01); *G06Q 50/28* (2013.01); *G07C 9/00174* (2013.01); *G06Q 50/30* (2013.01); *G07C 9/00658* (2013.01); *G07C 9/00896* (2013.01); *G07C 2009/0092* (2013.01); *G07C 2009/00753* (2013.01)

(58) Field of Classification Search
CPC ............ G01F 23/2962; G01F 23/2968; G01F 25/0061; G06Q 50/28; B60R 25/24
USPC ........................................ 340/5.61
See application file for complete search history.

(56) References Cited

U.S. PATENT DOCUMENTS

| | | |
|---|---|---|
| 9,256,852 B1 | 2/2016 | Myllymaki |
| 2007/0186106 A1* | 8/2007 | Ting .................. H04L 63/0815 713/168 |
| 2011/0137759 A1 | 6/2011 | Wellington et al. |
| 2014/0254896 A1 | 9/2014 | Zhou et al. |
| 2015/0006005 A1 | 1/2015 | Yu et al. |
| 2015/0301150 A1 | 10/2015 | Stuckman et al. |
| 2015/0379796 A1* | 12/2015 | Glasgow ................. G09C 1/00 340/5.51 |

(Continued)

*Primary Examiner* — Ojiako K Nwugo
(74) *Attorney, Agent, or Firm* — Reinhart Boerner Van Deuren P.C.

(57) ABSTRACT

This disclosure relates to, inter alia, a method for checking the authorization to open a receiving compartment of an unmanned vehicle. A step of the method includes obtaining a request to open the receiving compartment of the unmanned vehicle and first proof of authorization information. A position of the unmanned vehicle and at least one environmental parameter dependent on the position of the unmanned vehicle is captured. The authorization of the request to open the receiving compartment of the unmanned vehicle is checked in dependence on the obtained first proof of authorization information, the captured position of the unmanned vehicle, and the captured environmental parameter. The receiving compartment of the unmanned vehicle is opened or caused to open only when the checking reveals that the request to open the receiving compartment of the unmanned vehicle is authorized.

28 Claims, 5 Drawing Sheets

(56) References Cited

U.S. PATENT DOCUMENTS

2015/0381633 A1* 12/2015 Grim .................... H04L 63/107
726/4
2016/0033966 A1    2/2016 Farris et al.
2018/0144302 A1*  5/2018 Murray ............ G06Q 10/08355

* cited by examiner

AUTHORIZATION TO OPEN A RECEIVING COMPARTMENT OF AN UNMANNED VEHICLE

CROSS-REFERENCE TO RELATED PATENT APPLICATION

This patent application claims priority to German Application No. 10 2016 118 994.4, filed Oct. 6, 2016, the entire teachings and disclosure of which are incorporated herein by reference thereto.

FIELD

Exemplary embodiments of the invention relate to a method, an apparatus and a computer program for checking the authorization to open a receiving compartment of an unmanned vehicle.

BACKGROUND

The prior art discloses unmanned vehicles having a receiving compartment for transporting one or more shipments. In order to be able to remove a shipment from the receiving compartment, the receiving compartment must be opened. For this purpose, the shipment recipient obtains, for example, a code which can be used by the shipment recipient to prove his authorization to open the receiving compartment with respect to the unmanned vehicle. Although this is convenient for the shipment recipient, there is the risk of the code being intercepted, or if he has sufficient time, being guessed by an attacker, with the result that this is considered to be non-secure, in particular for transporting valuable shipments.

SUMMARY OF SOME EXEMPLARY EMBODIMENTS OF THE INVENTION

Therefore, the object of the present invention is, inter alia, to overcome these problems and to increase the security for shipments during transport in unmanned vehicles.

The invention discloses a method for checking the authorization to open a receiving compartment of an unmanned vehicle, wherein the method comprises the following:
- obtaining a request to open the receiving compartment of the unmanned vehicle and first proof of authorization information;
- capturing a position of the unmanned vehicle and at least one environmental parameter dependent on the position of the unmanned vehicle;
- checking the authorization of the request to open the receiving compartment of the unmanned vehicle in dependence on the obtained first proof of authorization information, the captured position of the unmanned vehicle and the captured environmental parameter; and
- opening and/or causing opening of the receiving compartment of the unmanned vehicle only when the checking reveals that the request to open the receiving compartment of the unmanned vehicle is authorized.

The method according to the invention is performed, for example, by the unmanned vehicle or an apparatus which is part of the unmanned vehicle.

The invention further discloses an apparatus, wherein the apparatus comprises means configured to perform the method according to the invention or respective means for performing the steps of the method according to the invention.

In this case, various steps can be optionally performed by different means.

The means of the apparatus according to the invention may comprise hardware and/or software components. The means may comprise, for example, at least one memory containing program instructions of a computer program (for example of the computer program according to the invention) and at least one processor designed to execute program instructions from the at least one memory. Accordingly, an apparatus comprising at least one processor and at least one memory containing program instructions is also intended to be understood as having been disclosed according to the invention, wherein the at least one memory and the program instructions are configured, together with the at least one processor, to cause the apparatus to perform and/or control the method according to the invention.

Alternatively or additionally, the means may further comprise one or more wireless communication interfaces (for example one or more wireless network adapters) and/or one or more user interfaces (for example a keyboard, a mouse, a camera, a screen, a touch-sensitive screen, a loudspeaker, a microphone, etc.). It goes without saying that the apparatus may also comprise other means which have not been listed.

The apparatus according to the invention is, for example, an apparatus for checking the authorization to open a receiving compartment of an unmanned vehicle. The apparatus according to the invention corresponds to the mobile unmanned device or is part of the unmanned device, for example.

The invention further discloses a computer program, wherein the computer program comprises program instructions which are designed, when executed by at least one processor, to cause an apparatus (for example the apparatus according to the invention) to perform the method according to the first aspect.

The computer program according to the invention is included and/or stored on a computer-readable storage medium, for example. A computer-readable storage medium is intended to be understood as meaning, for example, a physical and/or tangible storage medium.

The features of the method according to the invention, the apparatus according to the invention and the computer program according to the invention are described below, partially by way of example.

An unmanned vehicle is intended to be understood as meaning, for example, an aircraft, a watercraft and/or a land vehicle, for example an aircraft, a watercraft and/or a land vehicle which comprises means for receiving and/or transporting one or more shipments and can at least partially move in an autonomous manner. For example, the unmanned vehicle comprises at least one receiving compartment which is closable by means of a door and/or a flap and is intended to receive and transport one or more shipments. A shipment is, for example, a package, a piece good, a parcel shipment (for example a parcel) and/or a mail shipment (for example a letter). The door and/or flap closes, for example, a housing and/or body opening of the unmanned vehicle, through which opening a receiving compartment of the vehicle is accessible. An unmanned vehicle is not intended to transport persons (for example neither to transport a driver nor to transport passengers), for example.

The request to open the receiving compartment of the unmanned vehicle is, for example, a request which is intended to be used to cause opening of the receiving compartment of the unmanned vehicle.

The first proof of authorization information contains and/or represents, for example, information for proving the authorization of a user to open the receiving compartment of the unmanned vehicle, for example in order to be able to remove a shipment from the receiving compartment or to place it in the receiving compartment. Proof of authorization information is intended to be understood as meaning, for example, a password, a passphrase, a personal identification number (PIN), a code, a gesture, a biometric feature (for example voice, face, fingerprint and/or iris), a security token, a QR code, a barcode and/or a digital signature.

The request to open the receiving compartment of the unmanned vehicle may contain the first proof of authorization information. For example, the first proof of authorization information is a part of the request to open the receiving compartment of the unmanned vehicle, with the result that the request to open the receiving compartment of the unmanned vehicle and the first proof of authorization information are obtained at the same time. Alternatively, however, the first proof of authorization information may also be obtained separately from the request to open the receiving compartment of the unmanned vehicle.

The request to open the receiving compartment of the unmanned vehicle and/or the first proof of authorization information may be obtained, for example, in the form of a user input and/or a communication message. For example, the request to open the receiving compartment of the unmanned vehicle and/or the first proof of authorization information are obtained at the unmanned vehicle and/or the apparatus according to the invention.

The position is captured continuously (for example at regular or irregular intervals of time) by means of a position sensor, for example.

The position sensor is, for example, a position sensor of a satellite-based positioning system such as the GPS system (Global Positioning System), the GLONASS system, the Galileo system and/or the Beidou system.

Alternatively or additionally, the position is at least partially captured by capturing communication signals according to a wireless communication technology at the position (for example by means of a wireless communication interface). For example, a triangulation and/or a trilateration may be at least partially carried out in dependence on the wireless communication signals capturable at the position according to a wireless communication technology in order to determine the position. One example of a wireless communication technology is a local radio network technology such as Radio Frequency Identification (RFID) and/or Near Field Communication (NFC) and/or Bluetooth (for example Bluetooth Version 2.1 and/or 4.0) and/or Wireless Local Area Network (WLAN). RFID and NFC are specified, for example, according to the ISO standards 18000, 11784/11785 and the ISO/IEC standard 14443-A and 15693. The Bluetooth specifications are currently available on the Internet at www[dot]Bluetooth[dot]org. WLAN is specified, for example, in the standards of the IEEE 802.11 family. Another example of a wireless communication technology is a trans-regional radio network technology, for example a Low Power Wide Area Network (LPWAN), and/or a mobile radio technology, for example the Global System for Mobile Communications (GSM) and/or Universal Mobile Telecommunications System (UMTS) and/or Long Term Evolution (LTE). The GSM, UMTS and LTE specifications are maintained and developed by the 3rd Generation Partnership Project (3GPP) and are currently available on the Internet, inter alia, at www[dot]3gpp[dot]com. One example of an LPWAN specification is the LoRa standard developed and maintained by the LoRa Alliance (www [dot]lora-alliance [dot]org).

The captured position represents, for example, the last captured position of the unmanned vehicle. If the unmanned vehicle is in a building and the position sensor cannot receive any satellite signals for capturing the position, for example, the captured position represents, for example, the last captured (for example before entering the building) position of the unmanned vehicle.

In addition to the position of the unmanned vehicle, an environmental parameter dependent on the position of the unmanned vehicle is captured. The capturing of the environmental parameter is intended to be understood as meaning, in particular, the capturing of a value of the environmental parameter.

The environmental parameter is captured, for example, by a sensor of the unmanned vehicle. The environmental parameter is captured, for example, continuously (for example at regular or irregular intervals of time). Alternatively, the environmental parameter is captured, for example, only when (for example at the current position of the unmanned vehicle) a request to open the receiving compartment of the unmanned vehicle is obtained. An environmental parameter dependent on the position of the unmanned vehicle is intended to be understood as meaning, for example, a physical and/or chemical variable, the value of which is dependent on the position of the unmanned vehicle.

For example, it is thereby possible to ensure that the unmanned vehicle is currently at a particular position (that is to say a position at which the environmental parameter is capturable). This is advantageous, for example, if it is not possible or is only possible to inaccurately capture the position of the unmanned vehicle at the current position of the unmanned vehicle, as is often the case inside buildings (for example in high-rise residential or office buildings, in shopping centers or in exhibition halls) or in areas having tall buildings.

The checking of the authorization of the request to open the receiving compartment of an unmanned vehicle comprises, for example, checking, in dependence on the captured position of the unmanned vehicle, the captured environmental parameter and the obtained first proof of authorization information, whether the receiving compartment can be opened. For example, it is possible to predetermine that the receiving compartment can be opened only at a predetermined position or within a predetermined area and/or only for a predetermined environmental parameter. It is further possible to predetermine that the receiving compartment can be opened only if the first proof of authorization information provides authorization to open the receiving compartment of the unmanned vehicle.

The opening and/or the causing of opening is/are intended to be understood as meaning, for example, the fact that an opening mechanism of a door and/or a flap of the unmanned vehicle, which closes a receiving compartment of the unmanned vehicle, is controlled to cause the opening mechanism to open the door and/or the flap (for example to unlock and open it/them). For example, the apparatus according to the invention comprises control means which are configured to accordingly control an opening mechanism of a door and/or a flap of the unmanned vehicle. One example of such an opening mechanism is an electronically controllable door lock and/or an electronically controllable locking unit. It goes without saying that the apparatus according to the invention may comprise the opening mechanism. However, the opening mechanism may also be separate from the apparatus according to the invention.

As a result of the fact that the captured position, the captured environmental parameter and the authorization information are taken into account when checking the authorization of the request to open the receiving compartment of the unmanned vehicle, the opening of the receiving compartment of the unmanned vehicle may be restricted to a predetermined position or a predetermined geographical area—even if it is not possible or is only possible to inaccurately capture the position of the unmanned vehicle at the current position of the unmanned vehicle. This is advantageous, in particular, in situations in which the unmanned vehicle is used to transport a shipment since, in these situations, the posting and delivery position of the shipment is often certain from the outset and (authorized) opening of the receiving compartment of the unmanned vehicle is expected only at these positions. Unauthorized opening attempts by an attacker on the transport route are therefore prevented—even if the attacker has gained knowledge of the first proof of authorization information. The invention therefore increases the security during transport for shipments during transport in unmanned vehicles.

In one exemplary embodiment of the invention, the request to open the receiving compartment is obtained by a user interface and/or by a wireless communication interface at the unmanned vehicle. For example, the user interface and/or the wireless communication interface for obtaining the request to open the receiving compartment is/are a part of the apparatus according to the invention and/or of the unmanned vehicle.

As disclosed above, a user interface is, for example, a keyboard, a mouse, a camera, a screen, a touch-sensitive screen, a loudspeaker and/or a microphone. Such a user interface can be used to obtain the request to open the receiving compartment, for example as a user input (for example as a keyboard or mouse input and/or as a speech input and/or as a gesture); for example, such a user input can be obtained from a shipment recipient and/or shipment sender.

A wireless communication interface is configured, for example, to transmit and/or receive information according to a wireless communication technology. As disclosed above, examples of a wireless communication technology are local radio network technologies (for example RFID, NFC, Bluetooth and/or WLAN) and trans-regional radio network technologies (for example LPWAN and/or mobile radio technologies).

A wireless communication interface is intended to be understood as meaning, for example, a wireless network adapter (for example an RFID, NFC, Bluetooth, WLAN, LPWAN, GSM, UMTS and/or LTE network adapter). Such a wireless network adapter comprises, for example, at least one antenna and a transceiving circuit.

A wireless communication interface can be used to obtain (i.e. receive) the request to open the receiving compartment, for example as a communication message, via a wireless communication path (for example according to one of the wireless communication technologies mentioned above); for example, such a communication message can be obtained (i.e. received) from a user terminal belonging to a shipment recipient and/or shipment sender.

In one exemplary embodiment of the invention, the first proof of authorization information is obtained by a user interface, a card interface and/or by a wireless communication interface at the unmanned vehicle.

For example, the user interface and/or the wireless communication interface and/or the card interface for obtaining the first proof of authorization information is/are a part of the apparatus according to the invention and/or of the unmanned vehicle.

The user interface and/or the wireless communication interface for obtaining the first proof of authorization information correspond(s), for example, to the user interface and/or communication interface (disclosed above) for obtaining the request to open the receiving compartment. Alternatively, however, the user interface and/or the wireless communication interface for obtaining the first proof of authorization information may also differ from the user interface and/or communication interface (disclosed above) for obtaining the request to open the receiving compartment.

The first proof of authorization information can be obtained by the user interface, for example as a user input (for example as a keyboard or mouse input and/or as a voice or speech input and/or as a gesture and/or as an input of a biometric feature); for example, such a user input can be obtained from a shipment recipient and/or shipment sender.

Alternatively or additionally, the first proof of authorization information can be obtained (i.e. received) by the wireless communication interface as a communication message via a wireless communication path (for example according to one of the wireless communication technologies mentioned above); for example, such a communication message can be obtained (i.e. received) from a user device belonging to a shipment recipient and/or shipment sender.

Furthermore, provision may also be made for the first proof of authorization information to be alternatively or additionally obtained as a communication message by a card interface. A card interface is, for example, a card reader for a chip card (for example for a cash card and/or a payment card such as a credit card or a bank card and/or a chip card according to the ISO 7816 standard). For example, the communication message is obtained by the card interface from a chip card belonging to the shipment recipient and/or shipment sender, which chip card is connected to the card interface.

In one exemplary embodiment of the invention, second proof of authorization information is obtained. For example, the second proof of authorization information is obtained separately from the first proof of authorization information at the unmanned vehicle.

The second proof of authorization information can be obtained, for example, by a user interface, a card interface and/or by a wireless communication interface at the unmanned vehicle, for example by a different interface (for example by a different user interface and/or a different card interface and/or a different wireless communication interface) than the first proof of authorization information.

The second proof of authorization information differs, for example, from the first proof of authorization information. The second proof of authorization information contains and/or represents, for example, information for proving the authorization of a user (for example a shipment recipient and/or shipment sender) to open the receiving compartment of the unmanned vehicle. This is advantageous, for example, in order to enable two-factor authentication.

In one exemplary embodiment of the invention, an environmental parameter dependent on the position of the unmanned vehicle is an image of an environment of the unmanned vehicle (for example an image captured at the current position of the unmanned vehicle).

The image represents, for example, a representation (for example a two-dimensional or three-dimensional representation and/or a graphical representation) of an environment of the vehicle.

For example, the at least one environmental parameter dependent on the position of the unmanned vehicle is captured by capturing an image of an environment of the vehicle. The image is captured, for example, by means of an image sensor of the apparatus according to the invention and/or of the unmanned vehicle. For example, the image is captured and/or the image is caused to be captured if a request to open the receiving compartment of the unmanned vehicle is obtained.

Such an image may be characteristic of the position (for example the current position) of the vehicle; for example, the image may contain an environmental feature which is characteristic of the position of the vehicle, such as a house number of a building in the environment of the vehicle, a house or apartment door in the environment of the vehicle, a doorbell panel in the environment of the vehicle, a barcode in the environment of the vehicle (for example on a house or apartment door), a biometric feature in the environment of the vehicle (for example a face of a caretaker and/or porter) and/or a landmark (for example a road sign and/or a characteristic building, etc.) in the environment of the vehicle.

In one exemplary embodiment of the invention, an environmental parameter dependent on the position of the unmanned vehicle is a noise, a radiation pattern, a signal pattern, a laser scanning pattern and/or a radar scanning pattern. In this case too, it may involve environmental parameters characteristic of the position of the vehicle.

In one exemplary embodiment of the invention, an environmental parameter dependent on the position of the unmanned vehicle is an availability of at least one wireless communication signal (for example at the current position of the unmanned vehicle).

The wireless communication signal is intended to be understood, for example, as being available at the position (for example the current position) of the unmanned vehicle if it is capturable by a wireless communication interface at the position of the unmanned vehicle. Furthermore, it is possible to predetermine, for example, that the wireless communication signal is available only when it is capturable by a wireless communication interface at the position of the unmanned vehicle with a signal strength above a predetermined signal strength threshold value or within a range of signal strength values. For example, the wireless communication signal is an LPWAN, WLAN, Bluetooth, RFID and/or NFC radio signal. These are wireless communication technologies with a short range (for example less than 50 m, preferably less than 20 m, particularly preferably less than 5 m), with the result that the availability of such a wireless communication signal is characteristic of the position of the vehicle.

For example, the at least one environmental parameter dependent on the position of the unmanned vehicle is captured by capturing at least one wireless communication signal at the position of the unmanned vehicle. It goes without saying that further wireless communication signals can also be captured.

The wireless communication signal is captured, for example, by a wireless communication interface of the unmanned vehicle.

For example, the wireless communication signal is captured and/or the wireless communication signal is caused to be captured if a request to open the receiving compartment of the unmanned vehicle is obtained.

For example, the wireless communication signal or a part of the wireless communication signal represents checking information. The checking information may be, for example, part of a communication message contained in or represented by the wireless communication signal. The checking information is configured, for example, to make it possible to check and/or determine the identity and/or origin of the wireless communication signal. For this purpose, the checking information may contain a digital signature, which confirms the origin and/or identity of the communication signal, and/or an identifier (for example an address such as a MAC address or an IP address and/or a name such as a network name or an SSID) of the sender of the wireless communication signal.

Alternatively or additionally, the checking information may represent, for example, a response to a request according to a challenge-response method. Furthermore, the checking information may also be a message according to a key exchange protocol, for example the Diffie-Hellman key exchange protocol or the Perfect Forward Secrecy key exchange protocol.

For example, the wireless communication signal is a communication signal from a Bluetooth beacon, for example a communication signal from a Bluetooth beacon provided at the posting and/or delivery position. For example, the shipment sender and/or recipient may obtain such a Bluetooth beacon from the transport company and may fit it at a desired delivery and/or posting position (for example their apartment door).

In one exemplary embodiment of the invention, the checking of the authorization of the request to open the receiving compartment comprises:
- checking whether the captured position corresponds to a predetermined position or is within a predetermined geographical area,
- checking whether the captured environmental parameter corresponds to a predetermined environmental parameter, and
- checking whether the first proof of authorization information provides authorization to open the receiving compartment of the unmanned vehicle.

The checking in order to determine whether the captured position corresponds to a predetermined position or is within a predetermined geographical area can be carried out, for example, by comparing the captured position with the predetermined position or with the predetermined geographical area.

The checking in order to determine whether the captured environmental parameter corresponds to a predetermined environmental parameter can furthermore be carried out by means of a comparison with the predetermined environmental parameter. In this case, the comparison can take place with a value, a threshold value and/or a range of values predetermined for the environmental parameter. Alternatively or additionally, it is possible to predetermine that there is a correspondence above a particular probability (for example more than 50%, preferably more than 75%, particularly preferably more than 90% or more than 95%) for a correspondence between the captured environmental parameter and the predetermined environmental parameter.

As disclosed above, the captured environmental parameter may be, for example, an availability of a wireless communication signal. In this example, a signal strength threshold value, above which a captured wireless communication signal is considered to be available, may be predetermined as the environmental parameter. In this example, the checking in order to determine whether the captured environmental parameter corresponds to a predetermined environmental parameter reveals a correspondence only when the captured wireless communication signal is captured with a signal strength above the signal strength threshold value. Alternatively or additionally, an identity and/or origin of a captured wireless communication signal may be predetermined (for example by predetermining an identifier of the transmitter of the communication signal). The identity and/or origin of the captured wireless communication signal can be determined, for example, by means of the checking information disclosed above. The checking in order to determine whether the captured environmental parameter corresponds to a predetermined environmental parameter reveals a correspondence, for example, only when the identity and/or origin of the captured wireless communication signal correspond(s) to the predetermined identity and/or origin.

As disclosed above, the captured environmental parameter may furthermore be an image, for example. In this example, the predetermined environmental parameter is, for example, a characteristic environmental feature such as a house number of a building, a house or apartment door, a doorbell panel and/or a landmark (for example a road sign and/or a characteristic building, etc.). For example, the checking in order to determine whether the captured environmental parameter corresponds to a predetermined environmental parameter reveals a correspondence when the captured image contains the predetermined characteristic environmental feature at least with the particular probability. This makes it possible to take into account changes (for example seasonal and/or weather-related changes) in the environment.

It goes without saying that authorization requirement specification information representing the predetermined position, the predetermined geographical area and/or the predetermined environmental parameter can be stored in a memory of the unmanned vehicle and/or of the apparatus according to the invention (for example as part of the authorization requirement specification disclosed below). For example, this authorization requirement specification information is communicated from a server (for example belonging to a transport company) to the unmanned vehicle and/or the apparatus according to the invention and is then stored in a memory of the unmanned vehicle and/or of the apparatus according to the invention.

As disclosed above, the first proof of authorization information contains and/or represents, for example, information for proving the authorization of a user (for example a shipment recipient and/or shipment sender) to open the receiving compartment of the unmanned vehicle.

For example, such proof of authorization information for the delivery (or posting) of a shipment is stored in a memory of the unmanned vehicle and/or of the apparatus according to the invention. For example, proof of authorization information for the delivery (or posting) of a shipment is generated by a server (for example belonging to a transport company) and is communicated to the unmanned vehicle and/or the apparatus according to the invention and to the shipment recipient (or shipment sender) and/or a user terminal belonging to the shipment recipient (or shipment sender), with the result that the shipment recipient (or shipment sender) can prove his authorization to open the receiving compartment of the unmanned vehicle with respect to the unmanned vehicle and/or the apparatus according to the invention by means of the proof of authorization information.

The checking in order to determine whether the first proof of authorization information provides authorization to open the receiving compartment of the unmanned vehicle is carried out, for example, by comparing the proof of authorization information represented by and/or contained in the obtained first proof of authorization information with proof of authorization information stored in a memory of the unmanned vehicle and/or of the apparatus according to the invention.

Alternatively or additionally, the first proof of authorization information may contain, for example, one or more pieces of validity information, for example an identifier (in particular a unique identifier) for the unmanned vehicle, an identifier (in particular a unique identifier) for the first proof of authorization information itself, temporal validity information (for example in the form of a "not before date", a "not after date", a "starting time of the day" and an "end time of the day" which indicate within which days and within which time of day the first proof of authorization information provides authorization to open the receiving compartment of the unmanned vehicle, for example from 27.3.2014 00:00:00 to 28.3.2014 23:59:59) and/or spatial validity information (for example in the form of the predetermined position and/or the predetermined geographical area and/or the predetermined environmental parameter). Accordingly, the checking may also comprise checking the validity of the first proof of authorization information in dependence on the validity information.

Furthermore, second proof of authorization information, which is obtained, for example, separately from the first proof of authorization information at the unmanned vehicle, as disclosed above, can possibly also be checked in order to determine whether it (for example alone or in combination with the first proof of authorization information) provides authorization to open the receiving compartment of the unmanned vehicle. This can take place in a manner corresponding to the checking of the first proof of authorization information.

For example, the predetermined position is a delivery and/or posting position of a shipment and/or the predetermined geographical area is an area around a delivery and/or posting position of a shipment, such as an area within a predetermined distance (for example less than 100 m, preferably less than 50 m, particularly preferably less than 10 m) around a delivery and/or posting position.

The delivery position of a shipment (for example of a shipment transported by the unmanned vehicle) corresponds, for example, to the address of the recipient of the shipment. A posting position of a shipment (for example a shipment to be transported by the unmanned vehicle) corresponds, for example, to the address of the sender of the shipment. It goes without saying that the delivery position may also be a position predetermined by the recipient of the shipment for the delivery of the shipment, and that the posting position may also be a position predetermined by the sender of the shipment for the posting of the shipment. This is advantageous, for example, in order to prevent (unauthorized) opening of the receiving compartment if the unmanned vehicle is not at the delivery and/or posting position of the shipment.

For example, the predetermined environmental parameter is an environmental parameter which is capturable at the delivery and/or posting position of the shipment. This is advantageous, for example, in order to be able to verify that the unmanned vehicle is actually at the delivery and/or posting position of the shipment.

In one exemplary embodiment of the invention, the authorization of the request to open the receiving compartment is at least partially checked in dependence on one or more authorization requirement specifications. In this case, the authorization requirement specifications may specify, for example, the conditions under which the request to open the receiving compartment is authorized.

For example, the authorization requirement specifications may assign proof of authorization information or a combination of pieces of proof of authorization information to a predetermined position or a predetermined geographical area and a predetermined environmental parameter for the delivery (or posting) of a shipment at this position or in this geographical area. In this example, the authorization requirement specifications may specify, for example, that, if the checking reveals that the captured position corresponds to the predetermined position or is within the predetermined geographical area and the captured environmental parameter corresponds to the predetermined environmental parameter and the obtained first proof of authorization information corresponds to the proof of authorization information for the delivery (or posting) of a shipment at this position or in this geographical area, the request to open the receiving compartment of the unmanned vehicle is authorized. Alternatively, a combination of pieces of proof of authorization information for the delivery (or posting) of a shipment at this position or in this geographical area may also be necessary, with the result that the request to open the receiving compartment of the unmanned vehicle is authorized, for example, only when the obtained first proof of authorization information and second obtained proof of authorization information correspond to this combination.

It goes without saying that the authorization requirement specifications may also specify a trust level which is used to decide whether the request to open the receiving compartment of the unmanned vehicle is authorized. In this case, the results of the checking of the captured position of the unmanned vehicle, the captured environmental parameter and the obtained first proof of authorization information (and possibly obtained second proof of authorization information) can be weighted on the basis of the predetermined trust level, for example, and it is then possible to decide, at least partially in dependence on this weighting, whether the request to open the receiving compartment of the unmanned vehicle is authorized.

For example, such a trust level (for example for shipments having a value of more than € 500) could specify that the combination of the results of checking the captured position of the unmanned vehicle and the captured environmental parameter, which is weighted with a predetermined weighting (for example 40:60), must be greater than a particular probability (for example more than 95%) so that the request to open the receiving compartment of the unmanned vehicle is authorized.

The authorization requirement specifications are at least partially determined, for example, in dependence on a shipment recipient and/or sender (for example historical order data and/or the location and time at which a shipment is ordered and/or a classification of the shipment recipient), a shipment transported by the unmanned vehicle (for example the value of the shipment), the captured position of the unmanned vehicle and/or the captured environmental parameter.

For example, a combination of pieces of proof of authorization information may be predetermined for shipments having a high value, whereas one piece of proof of authorization information suffices for shipments having a low value. For example, first proof of authorization information of a user input obtained by a user interface, such as a password, a passphrase, a PIN or a code, may suffice for shipments having a low value. In contrast, first proof of authorization information in the form of a user input obtained by a user interface, such as a password, a passphrase, a PIN or a code, can suffice only in combination with second proof of authorization information in the form of a communication message obtained by a card interface and/or by a wireless communication interface for shipments having a high value.

Further advantageous exemplary configurations of the invention can be gathered from the following detailed description of some exemplary embodiments of the present invention, in particular in conjunction with the figures. However, the figures accompanying the application are intended to be used only for the purpose of illustration but not for the purpose of determining the scope of protection of the invention. The accompanying drawings are not necessarily true to scale and are intended to only reflect the general concept of the present invention by way of example. In particular, features which are included in the figures are in no way intended to be considered a necessary part of the present invention.

DETAILED DESCRIPTION

Figure 1:
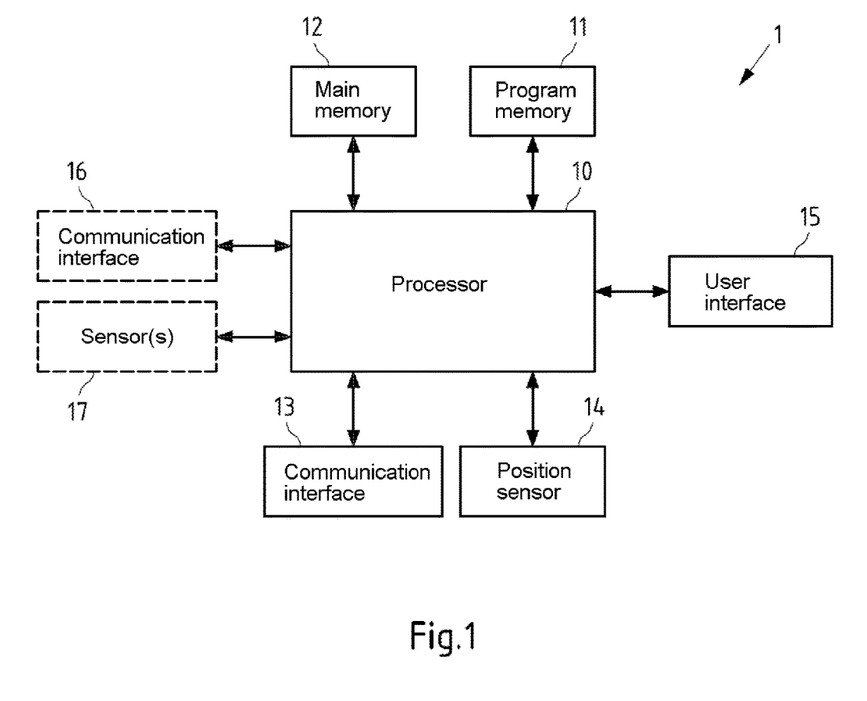
FIG. 1 shows a schematic illustration of an embodiment of an apparatus according to the invention.

FIG. 1 is a schematic illustration of an exemplary embodiment of an apparatus 1 according to the invention.

The apparatus 1 comprises, for example, a processor 10 and, connected to the processor 10, a first memory as a program and data memory 11, a second memory as a main memory 12, a first wireless communication interface 13, a position sensor 14 and a user interface 15. The apparatus 1 may further optionally comprise a second wireless communication interface 16 and/or one or more sensors 17.

A processor is intended to be understood as meaning, for example, a microprocessor, a micro-control unit, a microcontroller, a digital signal processor (DSP), an application-specific integrated circuit (ASIC) or a field programmable gate array (FPGA). It goes without saying that the apparatus 1 may also comprise a plurality of processors 10.

Processor 10 executes program instructions, which are stored in program memory 11, and stores intermediate results or the like in main memory 12, for example. The program memory 11 contains, for example, program instructions of a computer program according to the invention which comprises program instructions which cause the processor 10 to perform and/or control the method according to the invention (for example the method according to the flowchart 300 illustrated in FIG. 3) when the processor 10 executes these program instructions stored in program memory 11. One or more pieces of authorization requirement specification information may also be stored in program memory 11.

Program memory 11 further contains, for example, the operating system of the apparatus 1, which operating system is at least partially loaded into main memory 12, when the control apparatus 1 is started, and is executed by the processor 10. In particular, at least one part of the core of the operating system is loaded into the main memory 12, when the apparatus 1 is started, and is executed by processor 10.

One example of an operating system is a Windows, UNIX, Linux, Android, Apple iOS and/or MAC OS operating system. The operating system makes it possible, in particular, to use the control apparatus for data processing. It manages, for example, operating means such as a main memory and a program memory, provides other computer programs with fundamental functions, inter alia by means of programming interfaces, and controls the execution of computer programs.

A program memory is, for example, a non-volatile memory such as a flash memory, a magnetic memory, an EEPROM memory (electrically erasable programmable read-only memory) and/or an optical memory. A main memory is, for example, a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

Main memory 12 and program memory 11 may also be in the form of one memory. Alternatively, main memory 12 and/or program memory 11 may each be formed by a plurality of memories. Furthermore, main memory 12 and/or program memory 11 may also be part of the processor 10.

Processor 10 controls the first wireless communication interface 13 which is in the form of a Bluetooth interface, for example.

A wireless communication interface can receive, for example, information (via a wireless communication path) and can forward it to the processor and/or can receive information from the processor and can transmit it (via a wireless communication path). One example of a wireless communication interface is a wireless network adapter. For example, a wireless communication interface comprises, in addition to an antenna, at least one transmitter circuit and one receiver circuit or a transceiver circuit.

Figure 2:
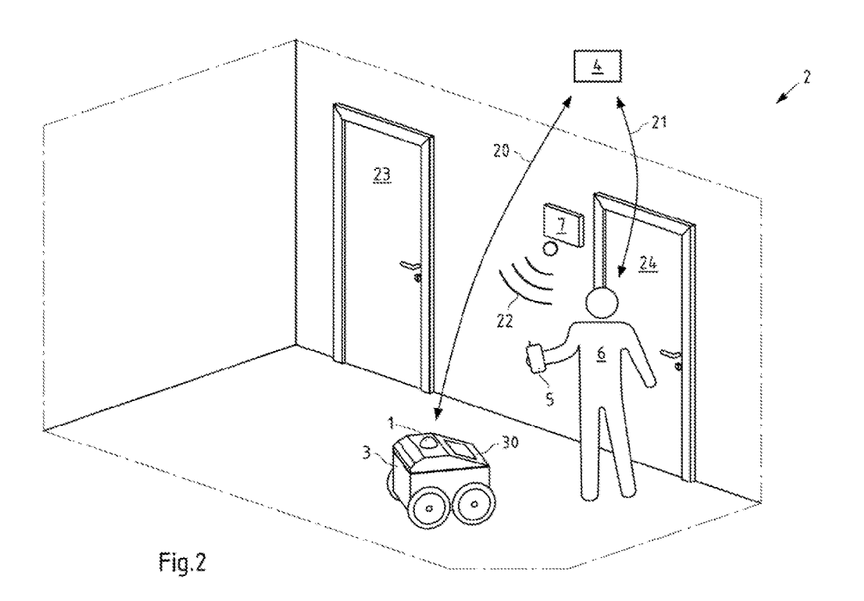
FIG. 2 shows a schematic illustration of an embodiment of a system having an apparatus according to the invention.

The wireless communication interface 13 is configured, for example, to receive a wireless communication signal (for example a Bluetooth signal from the Bluetooth beacon 7 illustrated in FIG. 2). The wireless communication interface 13 is further configured, for example, to communicate with a user terminal (for example the user terminal 5 illustrated in FIG. 2) via a Bluetooth connection.

Position sensor 14 is configured, for example, to capture a position of the apparatus 1. For example, position sensor 14 is a position sensor of a satellite-based positioning system such as the GPS system, the GLONASS system, the Galileo system and/or the Beidou system. Position sensor 14 is also controlled by processor 10.

Processor 10 further controls user interface 15 which is configured to output information to a user and/or to capture inputs by a user. As disclosed above, a user interface may be a keyboard, a mouse, a screen, a touch-sensitive screen, a loudspeaker, a microphone, etc.

The optional second wireless network interface 16 is likewise controlled by processor 10 and is in the form of a GSM, UMTS and/or LTE interface, for example. It is configured, for example, to communicate with a server (for example the server 4 belonging to a transport company illustrated in FIG. 3) via a wireless communication network (for example a GSM, UMTS and/or LTE network).

In addition, processor 10 controls a sensor 17, for example an image sensor 17. One example of an image sensor 17 is a camera or a CMOS sensor or a CCD sensor. It may be configured, for example, to capture an image of an environment of the apparatus 1.

It goes without saying that the apparatus 1 may also comprise a plurality of sensors 17.

The components 10 to 17 of the apparatus 1 are communicatively and/or operatively connected to one another, for example, via one or more bus systems (for example one or more serial and/or parallel bus connections).

It goes without saying that, in addition to the components 10 to 17, the apparatus 1 may comprise further components (for example a card interface such as a card reader).

FIG. 2 shows a schematic illustration of an embodiment of a system 2.

FIG. 2 illustrates the apparatus 1 disclosed in connection with FIG. 1 as part of an unmanned vehicle 3, for example. The unmanned vehicle 3 further has a receiving compartment 30 which is closed with a door. The unmanned vehicle 3 can transport a shipment in the receiving compartment 30.

In addition to the unmanned vehicle 3 having the apparatus 1, system 2 further comprises an optional server 4 belonging to a transport company and an optional user terminal 5 belonging to a user 6.

The user terminal 5 is illustrated in FIG. 2 as a mobile telephone, by way of example. It goes without saying that it may also have other configurations. For example, the user terminal may also be a smartwatch, a personal digital assistant, a portable navigation device, a tablet computer and/or a laptop computer.

The server 4 monitors and plans the posting, the transport and the delivery of a plurality of shipments to be transported by the transport company. For this purpose, the server 4 may also use and accordingly control a plurality of unmanned vehicles, for example for the purpose of posting, transporting and delivering one or more shipments inside buildings (for example in high-rise residential or office buildings, in shopping centers or in exhibition halls).

FIG. 2 illustrates optional communication connections 20 and 21. Server 4 can communicate with the unmanned vehicle 3, for example, via communication connection 20; and server 4 can communicate with the mobile user terminal 5, for example, via communication connection 21. The communication connections 20 and 21 are, for example, wireless communication connections via a mobile radio network (for example a GSM, UMTS and/or LTE network) or include one or more wireless communication connections via such a mobile radio network.

The system further comprises an optional Bluetooth beacon 7 which emits a communication signal 22.

FIG. 2 illustrates the unmanned vehicle 3, for example, in a hallway of a residential building between an apartment door 23 and an apartment door 24. For example, the unmanned vehicle 3 transports, in the receiving compartment 30, a shipment which is intended to be delivered to the user 6 having the user terminal 5 at the apartment door 24.

Figure 3:
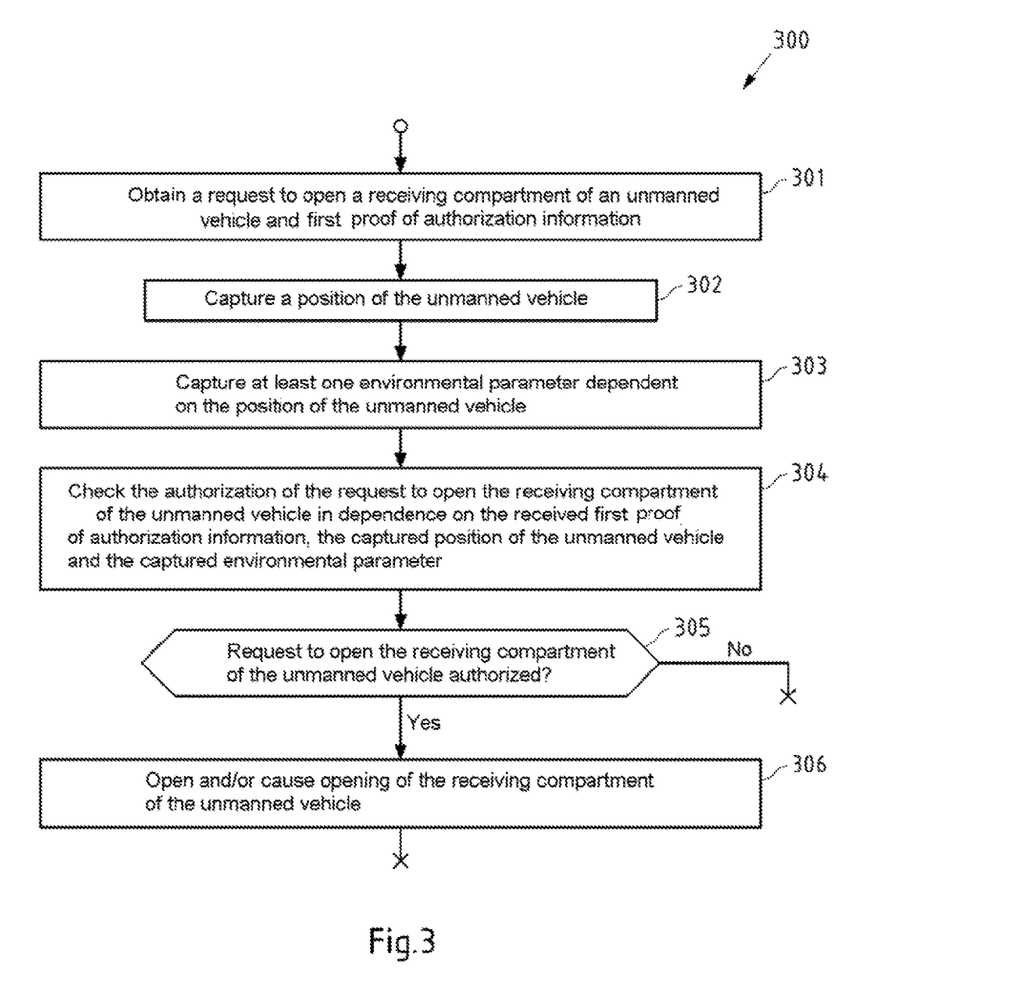
FIG. 3 shows a flowchart of an exemplary embodiment of a method according to the invention.

FIG. 3 shows a flowchart having steps of an exemplary embodiment of a method according to the invention. It is assumed by way of example below that steps 301 to 306 of the flowchart 300 are performed by the apparatus 1 which is part of the unmanned vehicle 3 in system 2 (cf. FIG. 2).

In a step 301, a request to open the receiving compartment 30 of the unmanned vehicle 3 and first proof of authorization information are obtained at the apparatus 1.

The first proof of authorization information is, for example, a password, a passphrase, a PIN or a code. For example, the server generated the first proof of authorization information for delivering a shipment transported in the receiving compartment 30 of the unmanned vehicle and then communicated it, via the communication connections 20 and 21, to the apparatus 1 and to the user terminal 5 belonging to the user 6 who is, for example, the shipment recipient of the shipment transported in the receiving compartment 30 of the unmanned vehicle 3. The first proof of authorization information is stored, for example, in memory 11 of the apparatus 1 (for example as authorization requirement specification information).

With the aid of the first proof of authorization information, the user 6 can therefore prove his authorization to open the receiving compartment 30 of the unmanned vehicle 3 with respect to the apparatus 1.

For example, the request to open the receiving compartment 30 of the unmanned vehicle 3 and/or the first proof of authorization information are obtained in step 301 by the user interface 15 of the apparatus 1 as an input by the user 6. It goes without saying that the request to open the receiving compartment 30 of the unmanned vehicle 3 and/or the first proof of authorization information can be alternatively also received in step 301 by the wireless communication interface 13 of the apparatus as a communication message from the user terminal 6, for example.

In a step 302, the position of the unmanned vehicle 3 is captured. The position of the unmanned vehicle 3 is captured, for example, by the position sensor 14 of the apparatus 1. The apparatus 1 is part of the unmanned vehicle 3, with the result that the position of the apparatus 1 corresponds to the position of the unmanned vehicle 3.

The position of the unmanned vehicle 3 is captured, for example, continuously (for example at regular or irregular intervals of time). The position captured in step 302 is intended to be understood as meaning, for example, the position of the unmanned vehicle 3 last captured by the position sensor 14. If the unmanned vehicle 3 is in a building and the position sensor 14 cannot receive any satellite signals for capturing the position, for example, the position captured in step 302 is intended to be understood as meaning the position of the unmanned vehicle 3 last captured (for example before entering the building) by the position sensor 14.

In a step 303, at least one environmental parameter dependent on the position of the unmanned vehicle 3 is captured.

As disclosed above, an environmental parameter dependent on the position of the unmanned vehicle is intended to be understood as meaning, for example, a physical and/or chemical variable, the value of which is dependent on the position of the unmanned vehicle. Accordingly, a value of the environmental parameter, for example, is captured in step 303.

The environmental parameter is captured, for example, continuously (for example at regular or irregular intervals of time). Alternatively, the environmental parameter is captured, for example, only when a request to open the receiving compartment of the unmanned vehicle is previously obtained. The environmental parameter captured in step 303 is intended to be understood as meaning, for example, the last captured environmental parameter or the last captured value of the environmental parameter.

One example of such an environmental parameter is an image of an environment of the unmanned vehicle. The image may represent, for example, a representation of the apartment door 24 or of a part of the apartment door 24. Such an image is captured, for example, by the optical sensor 17 of the apparatus 1.

Another example of an environmental parameter is an availability of a communication signal, for example the availability of the communication signal 22 emitted by the Bluetooth beacon 7. Such a communication signal can be captured, for example, by the wireless communication interface 16 of the apparatus 1.

In a step 304, the authorization of the request to open the receiving compartment 30 of the unmanned vehicle 3 is checked in dependence on the first authorization information obtained in step 301, the position of the unmanned vehicle captured in step 302 and the environmental parameter captured in step 303.

For example, it is possible to predetermine that the receiving compartment can be opened only at a predetermined position or within a predetermined area and/or only for a predetermined environmental parameter. It is further possible to predetermine that the receiving compartment can be opened only if the first proof of authorization information provides authorization to open the receiving compartment of the unmanned vehicle. These authorization requirement specifications are generated, for example, by server 4 for delivering the shipment transported in the receiving compartment 30 of the unmanned vehicle 3 and are then communicated, as authorization requirement specification information, to the apparatus 1 via communication connection 20 and are stored in memory 11 of the apparatus 1.

Figure 4:
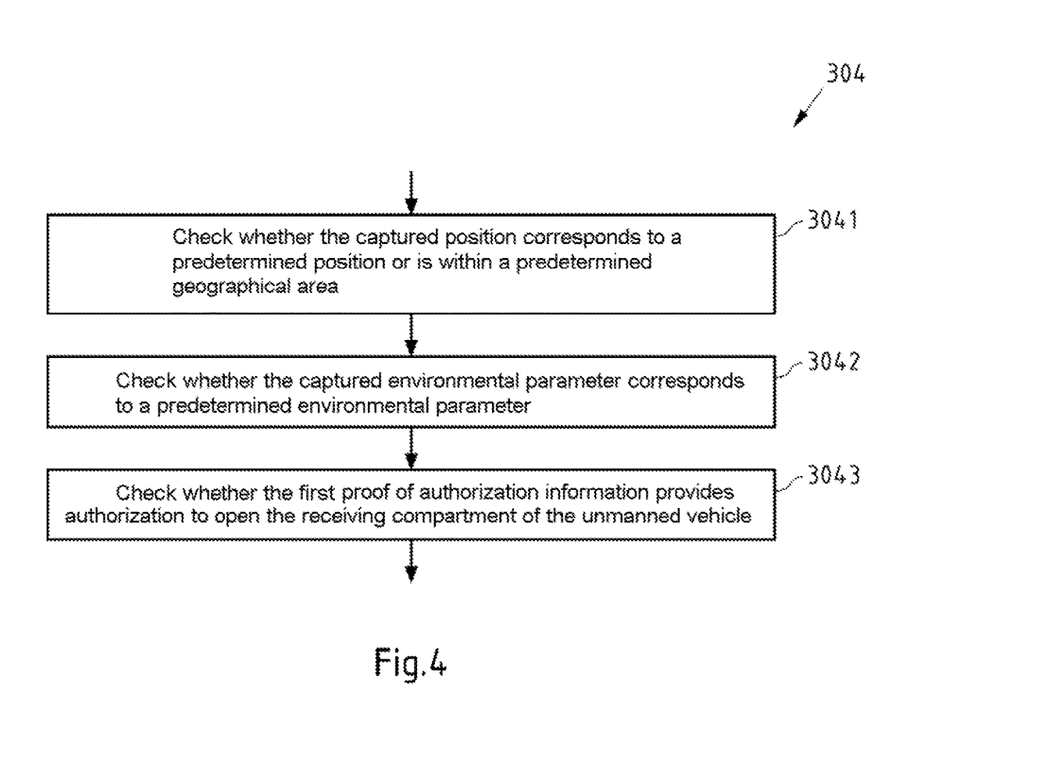
FIG. 4 shows possible steps when checking whether a request to open a receiving compartment of an unmanned vehicle is authorized.

FIG. 4 illustrates possible steps 3041 to 3043 which can take place according to an exemplary embodiment of a method according to the invention in step 304.

In step 3041, it is checked whether the position captured in step 302 corresponds to a predetermined position or is within a predetermined geographical area. For this purpose, the position captured in step 302 is compared, for example, with the predetermined position or the predetermined area.

The predetermined position is, for example, a delivery position (for example the postal address of the user 6) provided for the shipment transported in the receiving compartment 30 of the unmanned vehicle 3. Alternatively, the predetermined area may be, for example, a geographical area with a shipment transported in the receiving compartment 30 of the unmanned vehicle 3 around this delivery position. If the shipment is intended to be delivered in a building, the predetermined position corresponds, for example, to an entrance of the building and/or the building is within the predetermined area, for example. The checking in step 3041 therefore makes it possible to determine whether the unmanned vehicle is actually in the building or in the vicinity of the building.

In step 3042, it is checked whether the environmental parameter captured in step 303 corresponds to a predetermined environmental parameter.

The predetermined environmental parameter is, for example, an environmental parameter characteristic of the delivery position and/or a value characteristic of the delivery position and/or a range of values of an environmental parameter. This makes it possible to ensure, for example, that the unmanned vehicle 3 is at the delivery position or is in the vicinity of the delivery position if the environmental parameter captured in step 303 corresponds to the predetermined environmental parameter. This is advantageous, for example, if the delivery is intended to take place inside a building in order to be able to determine in step 3042 whether the unmanned vehicle in the building is at the delivery position or in the vicinity of the delivery position (for example the apartment door 24).

The predetermined environmental parameter may be, for example, an availability of a communication signal capturable at the delivery position (for example the communication signal 22 emitted by the Bluetooth beacon 7). For this purpose, an identity and/or origin of the communication signal and a signal strength threshold value may be predetermined, for example. In this case, the checking in step 3042 can be carried out by comparing the signal strength of a communication signal captured in step 303 with the predetermined signal strength threshold value and by checking and/or determining the identity and/or origin of the captured communication signal. For example, the captured communication signal represents checking information which is configured to check and/or determine the identity and/or origin of this communication signal. The checking information is, for example, an identifier (for example an address such as a MAC address or an IP address and/or a name such as a network name or an SSID) of the transmitter of the captured communication signal. For example, the checking in step 3042 is intended to reveal that there is a correspondence between the captured environmental parameter and the predetermined environmental parameter only when a communication signal of the predetermined identity and/or origin and with a signal strength above the predetermined signal strength threshold value is captured in step 303.

Alternatively or additionally, the predetermined environmental parameter may also be an environmental feature characteristic of the delivery position (for example the apartment door 24 or a doorbell panel fitted to the apartment door 24). For example, the checking in step 3042 is intended to reveal that there is a correspondence between the captured environmental parameter and the predetermined environmental parameter only when the characteristic environmental feature is contained in an image of the environment of the unmanned vehicle, which is captured in step 303, at least with a particular probability (for example more than 50%, preferably more than 75%, particularly preferably more than 90%).

In step 3043, it is checked whether the first proof of authorization information obtained in step 301 provides authorization to open the receiving compartment 30 of the unmanned vehicle 3. This can be carried out, for example, by comparing the obtained first proof of authorization information with proof of authorization information stored in the memory 11 of the apparatus 1. Only if there is a correspondence between the obtained first proof of authorization information and the proof of authorization information stored in the memory 11 does the checking in step 3034 reveal, for example, that the first proof of authorization information obtained in step 301 provides authorization to open the receiving compartment 30 of the unmanned vehicle 3.

It is possible to predetermine, for example, that the checking in step 304 reveals that the request to open the receiving compartment 30 of the unmanned vehicle 3 is authorized only when the result from steps 3041, 3042 and 3043 reveals that the abovementioned authorization requirement specifications have been complied with.

It goes without saying that the authorization requirement specifications may alternatively or additionally also specify a trust level which is used to decide whether the request to open the receiving compartment 30 of the unmanned vehicle 3 is authorized. In this case, the results of the checking of the captured position of the unmanned vehicle, the captured environmental parameter and the obtained first proof of authorization information (and possibly obtained second proof of authorization information) can be weighted on the basis of the predetermined trust level, for example, and it is then possible to decide, at least partially in dependence on this weighting, whether the request to open the receiving compartment of the unmanned vehicle is authorized.

If the checking in step 304 reveals that the request to open the receiving compartment 30 of the unmanned vehicle 3 is not authorized, the method is terminated in a step 305.

Otherwise, the receiving compartment 30 of the unmanned vehicle 3 is opened in a step 306 and/or the opening of the receiving compartment 30 of the unmanned vehicle 3 is caused. For example, the processor 10 of the apparatus 1 controls an opening mechanism of the door of the receiving compartment 30 of the unmanned vehicle 3 in order to cause opening of the receiving compartment 30.

Figure 5:
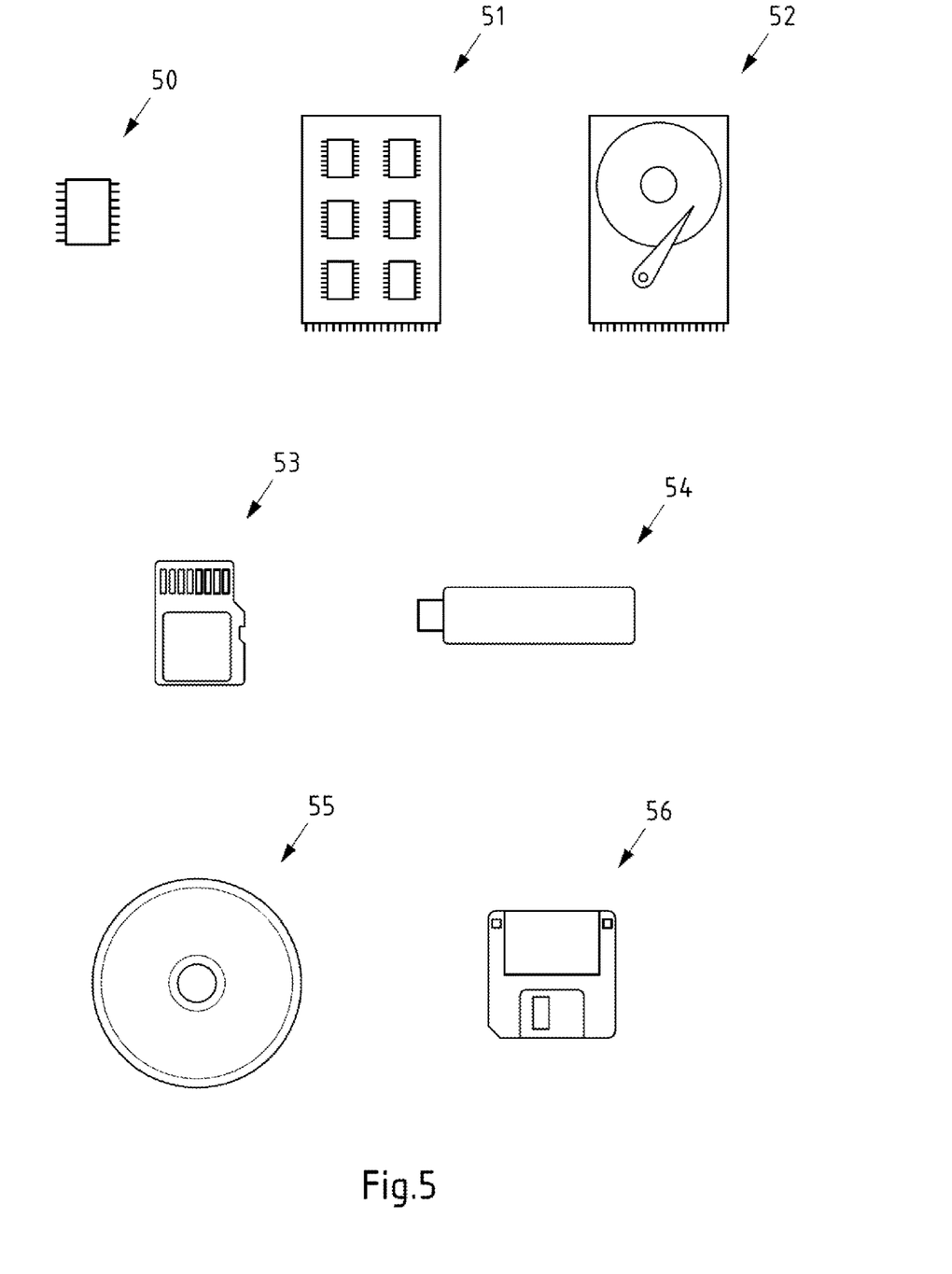
FIG. 5 shows exemplary embodiments of storage media.

FIG. 5 finally shows exemplary embodiments of storage media on which an exemplary embodiment of a computer program according to the invention can be stored. The storage medium may be, for example, a magnetic, electrical, optical and/or other storage medium. The storage medium may be, for example, part of a processor (for example the processor 10 in FIG. 1), for example a (non-volatile or volatile) program memory of the processor or a part thereof (for example memory 11 in FIG. 1). Exemplary embodiments of a storage medium are a flash memory 50, an SSD hard disk 51, a magnetic hard disk 52, a memory card 53, a memory stick 54 (for example a USB stick), a CD-ROM or DVD 55 or a floppy disk 56.

The exemplary embodiments of the present invention described in this specification are also intended to be understood as having been disclosed in all combinations with one another. In particular, the description of a feature included in an embodiment—unless explicitly stated to the contrary—is also not intended to be understood in the present case as meaning that the feature is indispensable or essential to the function of the exemplary embodiment. The sequence of the method steps described in this specification in the individual flowcharts is not compulsory and alternative sequences of the method steps are conceivable, unless indicated otherwise. The method steps can be implemented in various ways; an implementation in software (by means of program instructions), hardware or a combination of both is therefore conceivable for implementing the method steps.

All references, including publications, patent applications, and patents cited herein are hereby incorporated by reference to the same extent as if each reference were individually and specifically indicated to be incorporated by reference and were set forth in its entirety herein.

Terms used in the patent claims such as "comprise", "have", "contain", "include" and the like do not exclude further elements or steps. The wording "at least partially" includes both the case of "partially" and the case of "completely". The wording "and/or" is intended to be understood as meaning the fact that both the alternative and the combination are intended to be disclosed, that is to say "A and/or B" means "(A) or (B) or (A and B)". In the context of this specification, a plurality of units, persons or the like means several units, persons or the like. The use of the indefinite article does not exclude a plurality. An individual device may perform the functions of a plurality of units or devices mentioned in the patent claims. Reference symbols stated in the patent claims should not be considered as restrictions of the means and steps used.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for checking the authorization to open a receiving compartment of an unmanned vehicle, the method comprising:
    obtaining a request to open the receiving compartment of the unmanned vehicle and first proof of authorization information;
    capturing a position of the unmanned vehicle and at least one environmental parameter dependent on the position of the unmanned vehicle, wherein an environmental parameter dependent on the position of the unmanned vehicle is at least one of an image of an environment of the unmanned vehicle and an availability of at least one wireless communication signal, where the image of an environment of the unmanned vehicle contains an environmental feature which is characteristic of the position of the vehicle, wherein the availability of the at least one wireless communication signal is characteristic of the position of the vehicle;
    checking the authorization of the request to open the receiving compartment of the unmanned vehicle dependent on the obtained first proof of authorization information, the captured position of the unmanned vehicle and the captured environmental parameter; and
    opening and/or causing of opening of the receiving compartment of the unmanned vehicle only when the checking reveals that the request to open the receiving compartment of the unmanned vehicle is authorized.

2. The method according to claim 1, wherein the request to open the receiving compartment is obtained by a user interface and/or by a wireless communication interface at the unmanned vehicle.

3. The method according to claim 1, wherein the proof of authorization information is obtained by a user interface and/or by a card interface and/or by a wireless communication interface at the unmanned vehicle.

4. The method according to claim 1, wherein the at least one wireless communication signal is a communication signal from a Bluetooth beacon.

5. The method according to claim 4, wherein the wireless communication signal or a part of the wireless communication signal represents checking information.

6. The method according to claim 1, wherein the method further comprises:
    obtaining second proof of authorization information.

7. The method according to claim 6, wherein the second proof of authorization information is obtained separately from the first proof of authorization information.

8. The method according to claim 1, wherein the checking of the authorization of the request to open the receiving compartment comprises:
    checking whether the captured position corresponds to a predetermined position or is within a predetermined geographical area,
    checking whether the captured environmental parameter corresponds to a predetermined environmental parameter,
    checking whether the first proof of authorization information provides authorization to open the receiving compartment of the unmanned vehicle.

9. The method according to claim 8, wherein the predetermined position is a delivery and/or posting position of a shipment, and the predetermined environmental parameter is an environmental parameter which is capturable at the delivery and/or posting position of the shipment.

10. The method according to claim 1, wherein the authorization of the request to open the receiving compartment of the unmanned vehicle is at least partially checked dependent on an authorization requirement specification.

11. The method according to claim 10, wherein the authorization requirement specification is at least partially determined dependent on a shipment recipient and/or sender of a shipment transported by the unmanned vehicle, a shipment transported by the unmanned vehicle, the captured position of the unmanned vehicle and/or the captured environmental parameter.

12. The method according to claim 1, wherein the at least one wireless communication signal is a communication signal from a Bluetooth beacon provided at the posting and/or delivery position.

13. The method according to claim 1, wherein the image of an environment of the unmanned vehicle contains a house number of a building in the environment of the vehicle, a house or apartment door in the environment of the vehicle, a doorbell panel in the environment of the vehicle, a barcode in the environment of the vehicle, and/or a landmark in the environment of the vehicle.

14. An apparatus for checking the authorization to open a receiving compartment of an unmanned vehicle, the apparatus comprising at least one processor and at least one memory containing program instructions, wherein the at least one memory and the program instructions are configured, together with the at least one processor, to cause the apparatus to perform:
    obtaining a request to open the receiving compartment of the unmanned vehicle and first proof of authorization information;
    capturing a position of the unmanned vehicle and at least one environmental parameter dependent on the position of the unmanned vehicle, wherein an environmental parameter dependent on the position of the unmanned vehicle is at least one of an image of an environment of the unmanned vehicle and an availability of at least one wireless communication signal, wherein the image of an environment of the unmanned vehicle contains an environmental feature which is characteristic of the position of the vehicle, wherein the availability of the at least one wireless communication signal is characteristic of the position of the vehicle;

checking the authorization of the request to open the receiving compartment of the unmanned vehicle dependent on the obtained first proof of authorization information, the captured position of the unmanned vehicle and the captured environmental parameter; and opening and/or causing of opening of the receiving compartment of the unmanned vehicle only when the checking reveals that the request to open the receiving compartment of the unmanned vehicle is authorized.

15. The apparatus according to claim 14, wherein the request to open the receiving compartment is obtained by a user interface and/or by a wireless communication interface at the unmanned vehicle.

16. The apparatus according to claim 14, wherein the proof of authorization information is obtained by a user interface and/or by a card interface and/or by a wireless communication interface at the unmanned vehicle.

17. The apparatus according to claim 14, wherein the at least one wireless communication signal is a communication signal from a Bluetooth beacon.

18. The apparatus according to claim 17, wherein the wireless communication signal or a part of the wireless communication signal represents checking information.

19. The apparatus according to claim 14, wherein the at least one memory and the program instructions are further configured, together with the at least one processor, to cause the apparatus to perform:

obtaining second proof of authorization information.

20. The apparatus according to claim 19, wherein the second proof of authorization information is obtained separately from the first proof of authorization information.

21. The apparatus according to claim 14, wherein the checking of the authorization of the request to open the receiving compartment comprises:

checking whether the captured position corresponds to a predetermined position or is within a predetermined geographical area, checking whether the captured environmental parameter corresponds to a predetermined environmental parameter, checking whether the first proof of authorization information provides authorization to open the receiving compartment of the unmanned vehicle.

22. The apparatus according to claim 21, wherein the predetermined position is a delivery and/or posting position of a shipment, and the predetermined environmental parameter is an environmental parameter which is capturable at the delivery and/or posting position of the shipment.

23. The apparatus according to claim 14, wherein the authorization of the request to open the receiving compartment of the unmanned vehicle is at least partially checked dependent on an authorization requirement specification.

24. The apparatus according to claim 23, wherein the authorization requirement specification is at least partially determined dependent on a shipment recipient and/or sender of a shipment transported by the unmanned vehicle, a shipment transported by the unmanned vehicle, the captured position of the unmanned vehicle and/or the captured environmental parameter.

25. The apparatus according to claim 14, wherein the apparatus is or is part of the unmanned vehicle.

26. The apparatus according to claim 14, wherein the at least one wireless communication signal is a communication signal from a Bluetooth beacon provided at the posting and/or delivery position.

27. The apparatus according to claim 14, wherein the image of an environment of the unmanned vehicle contains a house number of a building in the environment of the vehicle, a house or apartment door in the environment of the vehicle, a doorbell panel in the environment of the vehicle, a barcode in the environment of the vehicle, and/or a landmark in the environment of the vehicle.

28. A non-transitory computer readable storage medium including a computer program comprising program instructions which are configured, when executed by at least one processor, to cause an apparatus to perform:

obtaining a request to open the receiving compartment of the unmanned vehicle and first proof of authorization information;

capturing a position of the unmanned vehicle and at least one environmental parameter dependent on the position of the unmanned vehicle, wherein an environmental parameter dependent on the position of the unmanned vehicle is at least one of an image of an environment of the unmanned vehicle and an availability of at least one wireless communication signal, wherein the image of an environment of the unmanned vehicle contains an environmental feature which is characteristic of the position of the vehicle, wherein the availability of the at least on wireless communication signal is characteristic of the position of the vehicle;

checking the authorization of the request to open the receiving compartment of the unmanned vehicle in dependent on the obtained first proof of authorization information, the captured position of the unmanned vehicle and the captured environmental parameter; and opening and/or causing of opening of the receiving compartment of the unmanned vehicle only when the checking reveals that the request to open the receiving compartment of the unmanned vehicle is authorized.

* * * * *